United States Patent
Tseng

(10) Patent No.: US 8,218,101 B2
(45) Date of Patent: Jul. 10, 2012

(54) ELECTRONIC DEVICE HAVING AN LCM WITH PARTICULAR FIXING ELEMENT

(75) Inventor: Chi-Ming Tseng, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 567 days.

(21) Appl. No.: 12/540,361

(22) Filed: Aug. 13, 2009

(65) Prior Publication Data

US 2011/0037918 A1  Feb. 17, 2011

(51) Int. Cl.
*G02F 1/1333* (2006.01)
*H02B 1/20* (2006.01)
*H02B 1/015* (2006.01)

(52) U.S. Cl. ............................ 349/58; 361/640; 361/644
(58) Field of Classification Search .................... 349/58; 361/640, 644
See application file for complete search history.

(56) References Cited

U.S. PATENT DOCUMENTS

| 5,805,474 A * | 9/1998 | Danielson et al. ....... 361/679.56 |
| 7,180,735 B2 * | 2/2007 | Thomas et al. .......... 361/679.56 |
| 2007/0099681 A1 * | 5/2007 | Kielland .................... 455/575.1 |

* cited by examiner

*Primary Examiner* — Mike Qi
(74) *Attorney, Agent, or Firm* — Lin & Associates IP, Inc.

(57) ABSTRACT

An electronic device having an LCM has a main body and an LCM. The main body has a rectangular base defining a top surface and a bottom surface opposite to the top surface. The top surface of the base has a receiving recess for receiving the LCM. The bottom surface of the base has at least one through hole communicating with the receiving recess. At least one fixing element has an adhesive portion received into the through hole. Two connecting portions respectively extend perpendicularly from the ends of the adhesive portion. Two fixing portions respectively extend outwards from the connecting portions. Two contacting portions each extend from the fixing portions and bend inwards. The fixing portions and the contacting portions will clasp the bottom surface of the base when the adhesive portion is received into the through hole and removably connected with the LCM by conductive adhesive.

8 Claims, 5 Drawing Sheets

ELECTRONIC DEVICE HAVING AN LCM WITH PARTICULAR FIXING ELEMENT

BACKGROUND OF THE INVENTION

1. Field of the Invention

The invention relates to an electronic device, and more particularly to an electronic device having an LCM.

2. The Related Art

With the development of electronic technology, an electronic device having an LCM (liquid crystal module) is used widely. The electronic device includes a main body and an LCM provided with the main body. The LCM includes a liquid crystal panel and a frame coupled with the liquid crystal panel. The main body has a base defining a receiving recess for accommodating the LCM. The LCM is straightly stuck in the receiving recess of the base by double-sided adhesives for fixing the LCM on the main body firmly. Such fixing structure is likely to damage the liquid crystal panel of the LCM or other components when the LCM is disengaged from the main body. So it is desirable to produce an electronic device having an LCM which can solve the problem of disengagement between the LCM and the main body.

SUMMARY OF THE INVENTION

An object of the present invention is to provide an electronic device having an LCM capable of preventing an LCM from being broken in disassembly. The electronic device having an LCM has a main body and an LCM. The main body has a rectangular base defining a top surface and a bottom surface opposite to the top surface. The top surface of the base has a receiving recess for receiving the LCM. The bottom surface of the base has at least one through hole communicating with the receiving recess. At least one fixing element has an adhesive portion received into the through hole. Two connecting portions respectively extend perpendicularly from the ends of the adhesive portion. Two fixing portions each extend outwards perpendicularly to the connecting portions. Two contacting portions each extend from the fixing portions and bend inwards opposite to the fixing portions. The fixing portions and the contacting portions will clasp the bottom surface of the base when the adhesive portion of the fixing element is received in the through hole and removably connected with the LCM by conductive adhesive.

As described above, the LCM is fixed on the base of the main body by the conductive adhesive on the adhesive portion of the fixing element. The fixing element is able to be separated from the base. When the LCM is disengaged from the main body, just need to separate the fixing element from the base of the main body and without removing the LCM, which is useful to prevent the LCM from being broken in disassembly.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
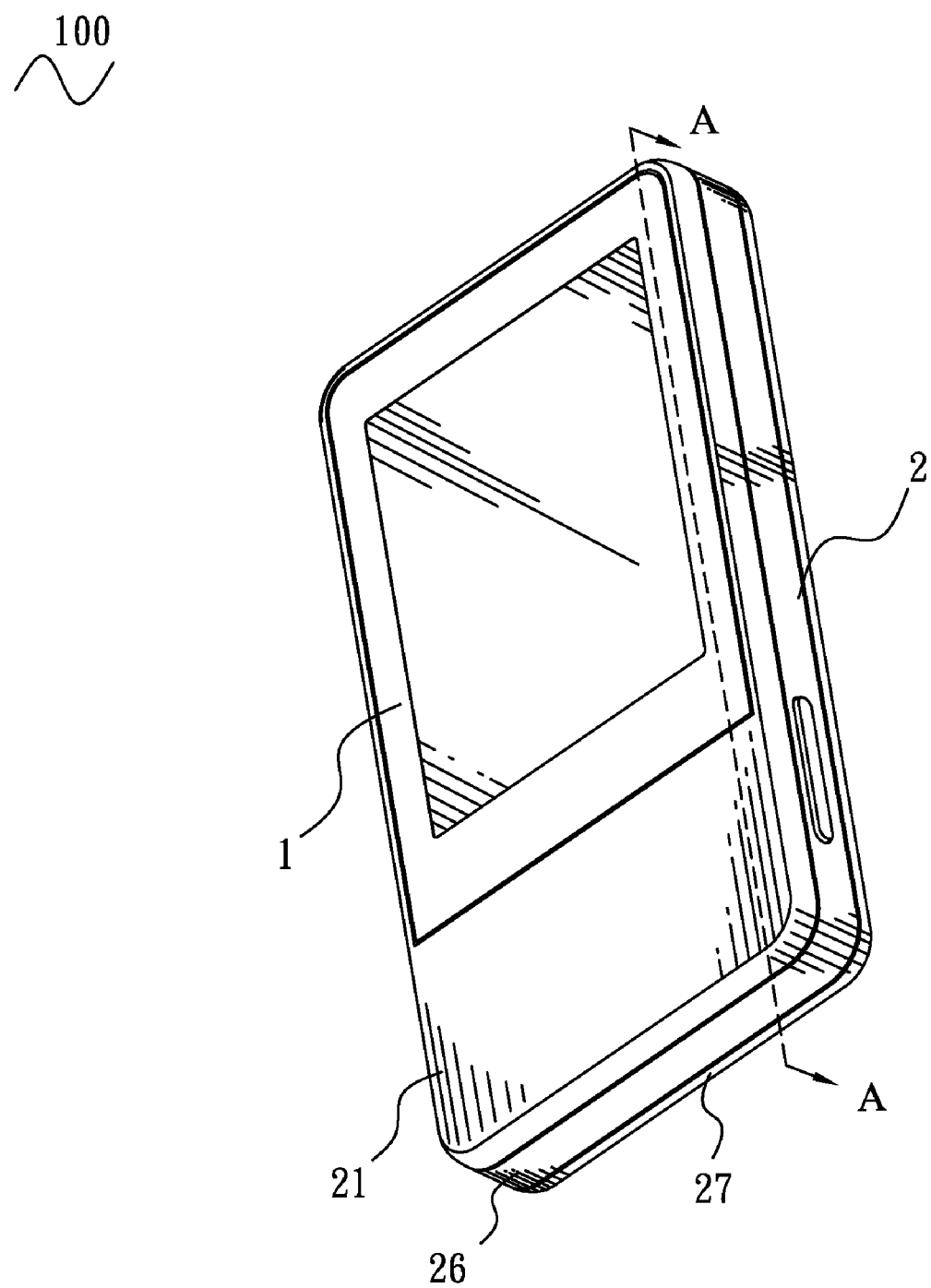
FIG. 1 is a perspective view of an electronic device having an LCM according to the present invention.
Figure 2:
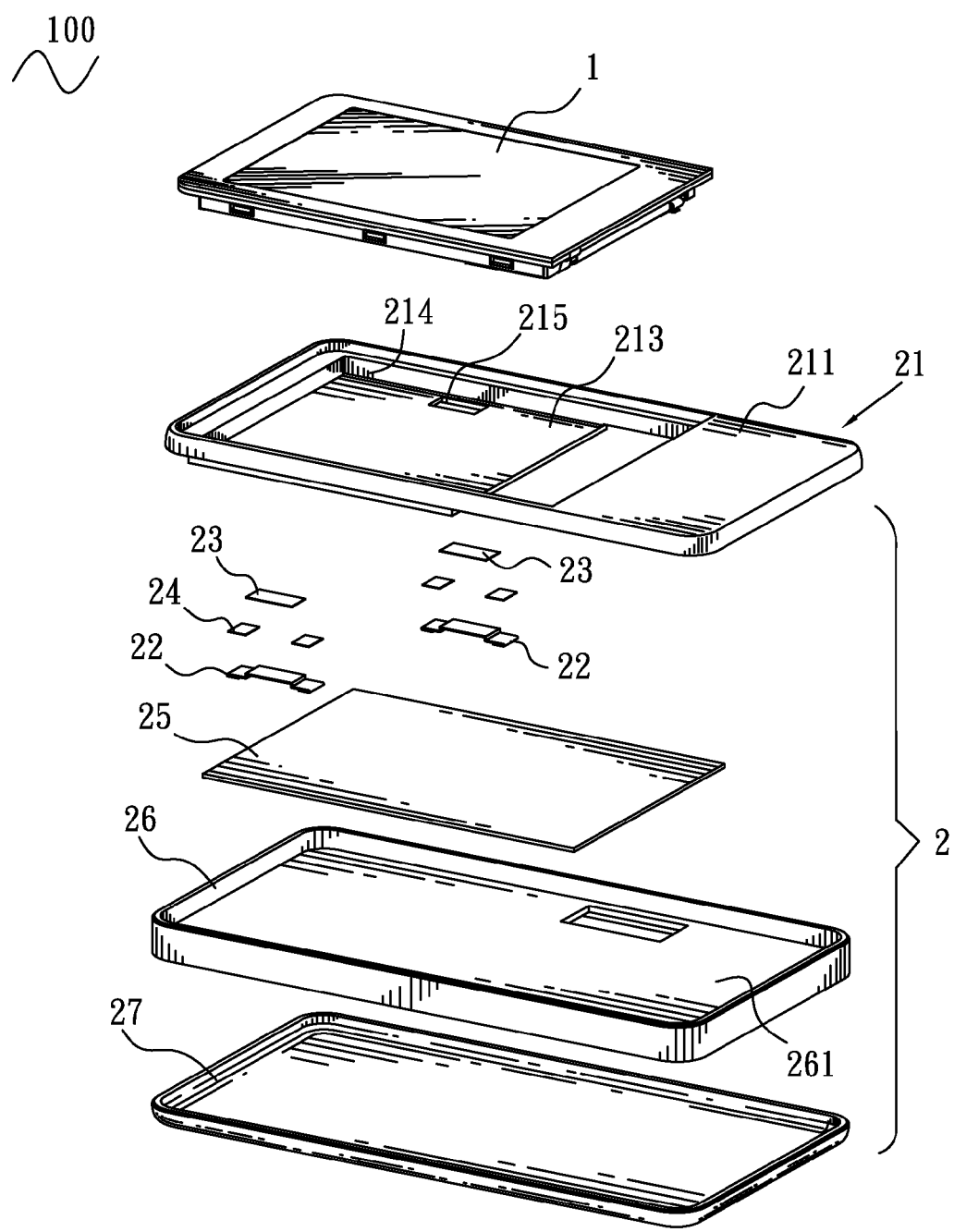
FIG. 2 is an exploded view of the electronic device having an LCM shown in FIG 1.

With reference to FIGS. 1-2, an electronic device having an LCM 100 according to the present invention is shown. The electronic device having an LCM 100 includes a liquid crystal module (LCM) 1 and a main body 2 receiving the LCM 1. The main body 2 includes a rectangular base 21, two fixing elements 22, two conductive adhesives 23, a plurality of double-sided adhesives 24, a printed circuit board (PCB) 25, a middle shell 26 and a lower shell 27.

Figure 3:
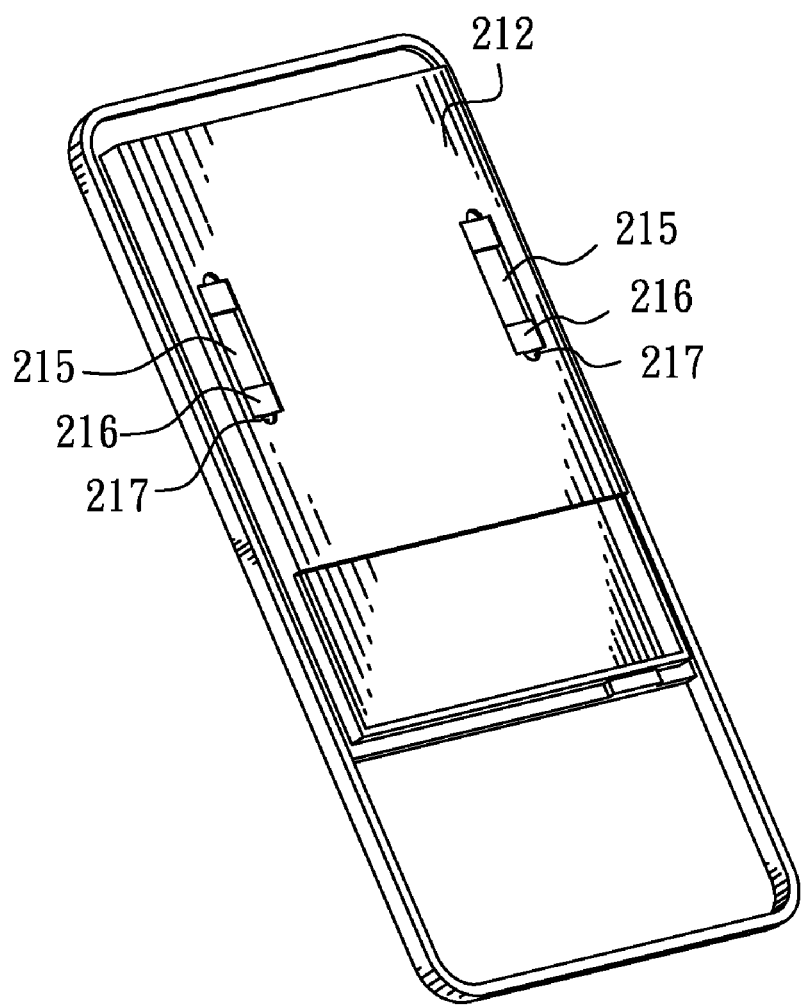
FIG. 3 is a perspective view of a base of the electronic device having an LCM shown in FIG. 2 seen from a bottom direction.

Please refer to FIGS. 2-3, the base 21 defines a top surface 211 and a bottom surface 212 opposite to the top surface 211. The top surface 211 has a receiving recess 213 capable of mating with a shape of the LCM 1 for receiving the LCM 1. The receiving recess 213 is rectangular and defines two opposite long lateral walls 214. Two rectangular through holes 215 are symmetrically disposed at two sides of the bottom surface 212 of the base 21 and adjacent to the two opposite long lateral walls 214, respectively. The bottom surface 212 has two fixing recesses 216 respectively arranged at two ends of each of the through holes 215. The fixing recesses 216 communicate with the corresponding through holes 215. A disassembling recess 217 is extended opposite to the through hole 215 from an end of the fixing recess 216 to show an approximate semicircular shape.

Figure 4:
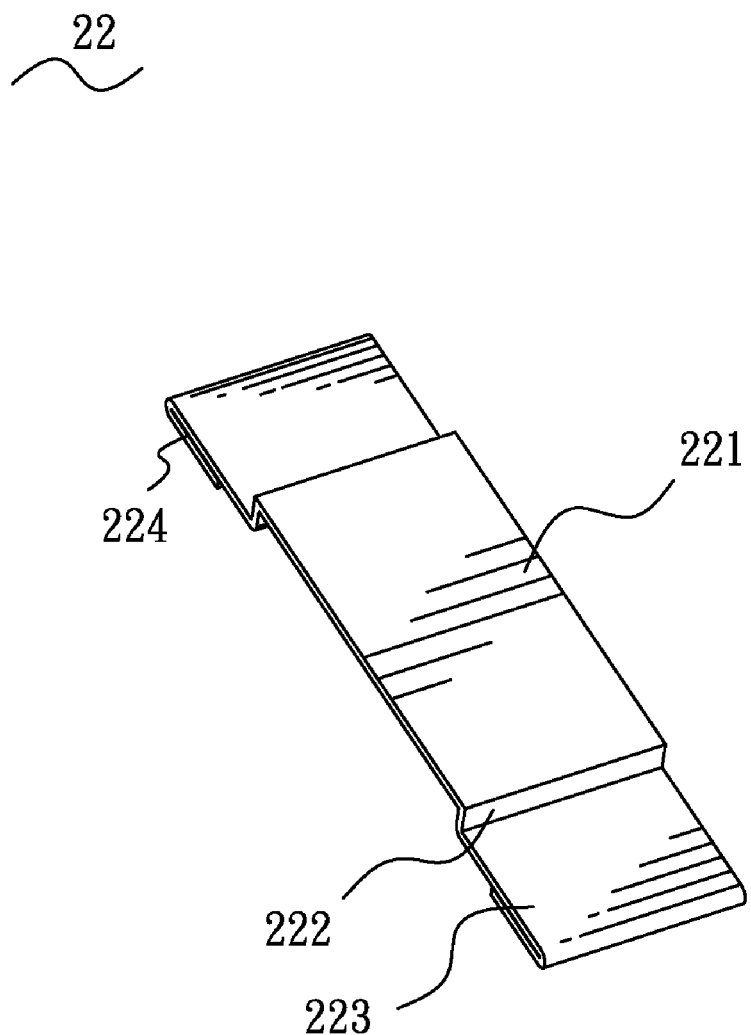
FIG. 4 is a perspective view of a fixing element of the electronic device having an LCM shown in FIG. 2.

Referring to FIGS. 2-4, the fixing element 22 is formed by bending a metal plate and has a rectangular adhesive portion 221 corresponding to the through hole 215. Two ends of the adhesive portion 221 extend perpendicularly to form two facing connecting portions 222. Each of the connecting portions 222 has a free end extended toward an opposite direction to the adhesive portion 221 to form a fixing portion 223. A free end of the fixing portion 223 is bent to form a contacting portion 224, underlaid the fixing portion 223 in doubly overlapping manner. In this embodiment, the length of the contacting portion 224 is a half of the length of the fixing portion 223. The conductive adhesive 23 is a rectangular shape and has a size same as that of the adhesive portion 221. The size of the double-sided adhesive 24 is matched with that of the fixing portion 223. The middle shell 26 has a receiving chamber 261 for receiving the PCB 25.

Figure 5:
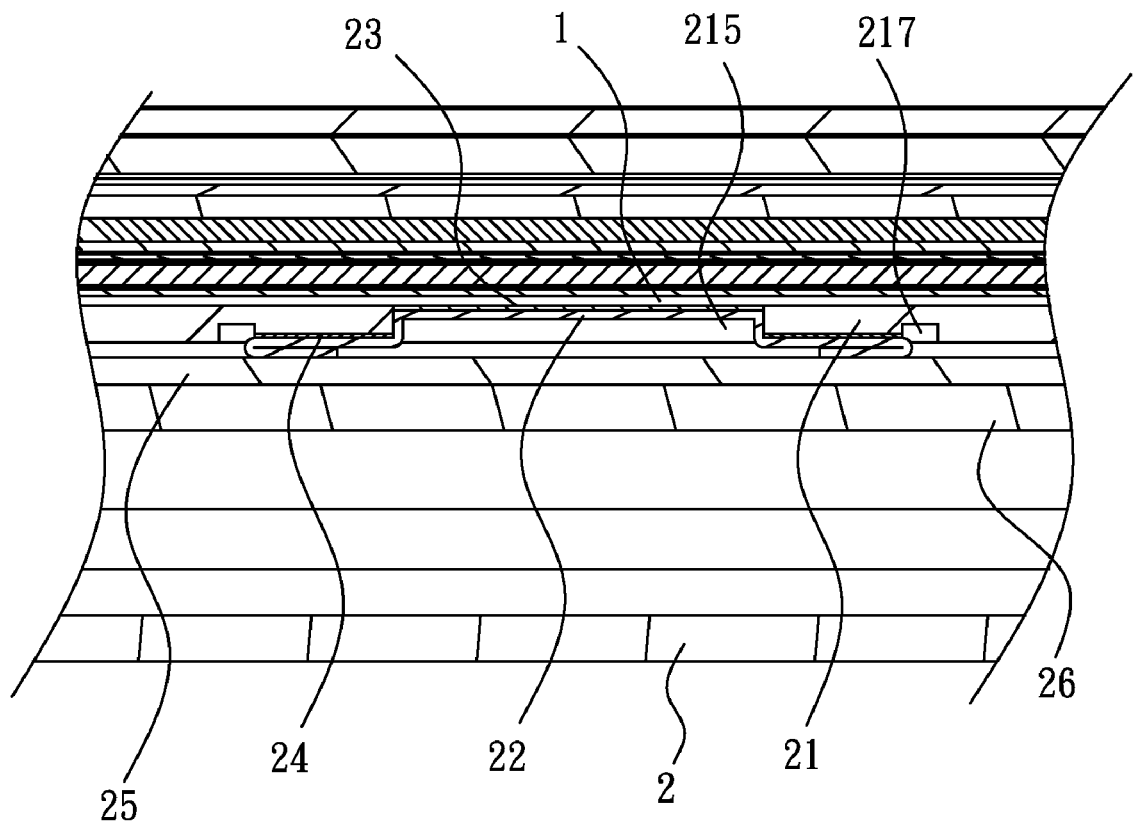
FIG. 5 is a partly cross-sectional view of the electronic device having an LCM taken along line A-A shown in FIG. 1.

With reference to FIG. 5, in assembly, the adhesive portion 221 is received in the through hole 215. The double-sided adhesive 24 is disposed between the fixing recess 216 and the fixing portion 223 to fix the fixing portion 223 in the fixing recess 216. Thus the fixing element 22 is fixed on the base 21 steadily. The contacting portion 224 of the fixing element 22 exceeds the bottom surface 212 of the base 21. The conductive adhesive 23 is stuck on the adhesive portion 221 of the fixing element 22 and exposed out of a bottom wall of the receiving recess 213 for pasting the LCM 1 received into the receiving recess 213. The PCB 25 is received into the receiving chamber 261 of the middle shell 26. When the middle shell 26 is coupled with the base 21, the contacting portion 224 of the fixing element 22 will electrically connect with the PCB 25, which will prevent the electronic device having an LCM 100 from being interfered by the electrostatic discharge (ESD). The lower shell 27 is firmly coupled with a bottom of the middle shell 26.

As describe above, the LCM 1 is fixed on the base 21 of the main body 2 by the conductive adhesive 23 on the adhesive portion 221 of the fixing element 22. When the LCM 1 is required to disengage from the main body 2, a jig will be inserted into the disassembling recess 217 to disassemble the fixing element 22 from the base 21 of the main body 2, thereby the LCM 1 and the main body 2 are separated. So the LCM 1 is conveniently disengaged from the main body 2 without removing the LCM 1, which is useful to protect a liquid crystal panel or other components of the LCM 1.

Furthermore, the present invention is not limited to the embodiment described above; various additions, alterations and the like may be made within the scope of the present invention by a person skilled in the art. For example, respective embodiments may be appropriately combined.

What is claimed is:

1. An electronic device having an LCM, comprising:
   a main body having a rectangular base defined a top surface and a bottom surface opposite to the top surface, the top surface having a receiving recess, the bottom surface having at least one through hole communicating with the receiving recess;
   an LCM received in the receiving recess; and
   at least one fixing element, the fixing element having an adhesive portion received into the through hole, two connecting portions respectively extending perpendicularly from the ends of the adhesive portion, two fixing portions each extending outwards perpendicularly to the connecting portions, and two contacting portions each extending from the fixing portions and bent inwards opposite to the fixing portions; the fixing portions and the contacting portions clasping the bottom surface of the base when the adhesive portion of the fixing element is received in the through hole and removably connected with the LCM by conductive adhesive.

2. The electronic device having an LCM as claimed in claim 1, wherein the main body further includes a middle shell for mating with the base, and a lower shell coupled with a bottom of the middle shell.

3. The electronic device having an LCM as claimed in claim 1, wherein the receiving recess is rectangular and defines two opposite long lateral walls, two rectangular through holes are symmetrically disposed at two sides of the bottom surface of the base and adjacent to the two opposite long lateral walls, respectively.

4. The electronic device having an LCM as claimed in claim 3, wherein the adhesive portion of the fixing element is rectangular corresponding with the through hole.

5. The electronic device having an LCM as claimed in claim 1, wherein the bottom surface of the base has two fixing recesses respectively arranged at two ends of the through hole and communicating with the through hole, the fixing portion of the fixing element is fixed into the fixing recess by double-sided adhesives therebetween.

6. The electronic device having an LCM as claimed in claim 5, wherein the bottom surface of the base has a disassembling recess communicating with the fixing recess for disengaging the fixing element from the base.

7. The electronic device having an LCM as claimed in claim 1, wherein a free end of the fixing portion is bent to form a contacting portion, underlaid the fixing portion in doubly overlapping manner, the contacting portion is electrically connected with the PCB received in the main body for preventing the electrostatic discharge.

8. The electronic device having an LCM as claimed in claim 1, wherein the fixing element is formed by bending a metal plate.

* * * * *